US007689247B2

(12) United States Patent
Dawood et al.

(10) Patent No.: US 7,689,247 B2
(45) Date of Patent: Mar. 30, 2010

(54) METHOD AND APPARATUS FOR RADIO FREQUENCY BAND ASSIGNMENT IN A WIRELESS COMMUNICATION SYSTEM

(75) Inventors: Mohamad A. Dawood, Hoffman Estates, IL (US); Kent M. Conness, Downers Grove, IL (US)

(73) Assignee: Motorola, Inc, Schaumburg, IL (US)

( * ) Notice: Subject to any disclaimer, the term of this patent is extended or adjusted under 35 U.S.C. 154(b) by 276 days.

(21) Appl. No.: 11/151,710

(22) Filed: Jun. 13, 2005

(65) Prior Publication Data

US 2006/0003799 A1    Jan. 5, 2006

Related U.S. Application Data

(60) Provisional application No. 60/584,376, filed on Jun. 30, 2004.

(51) Int. Cl.
H04M 1/00 (2006.01)
(52) U.S. Cl. .................... 455/552.1; 455/439; 455/553; 370/229; 370/331; 370/333
(58) Field of Classification Search ................ 455/552, 455/439, 553, 461, 552.1; 370/229, 331, 370/333
See application file for complete search history.

(56) References Cited

U.S. PATENT DOCUMENTS

| 5,287,545 | A | * | 2/1994 | Kallin ........................ 455/510 |
| 5,862,481 | A | * | 1/1999 | Kulkarni et al. .......... 455/432.2 |
| 5,907,812 | A | * | 5/1999 | Van De Berg ............... 455/461 |
| 6,011,786 | A | | 1/2000 | Dent |

(Continued)

FOREIGN PATENT DOCUMENTS

CN    1413036 A    4/2003

(Continued)

OTHER PUBLICATIONS

Bai, Jun-Jie et al.: "The Method of Solving Dual Frequency Mobile Telephone Continuous Handover Failure Problem in Multiband", Tianjin Mobile Communication Technology, No. 2, Jun. 30, 2002.

(Continued)

*Primary Examiner*—Patrick N Edouard
*Assistant Examiner*—Julio Perez
(74) *Attorney, Agent, or Firm*—Steven A. May

(57) ABSTRACT

A wireless communication system comprises a mobile station in communication with an infrastructure that supports multiple radio frequency (RF) band classes. When the infrastructure receives a request to originate a call from the mobile station via a first radio frequency (RF) band of the multiple RF bands, the infrastructure determines whether to attempt to assign the mobile station to an RF band other than the first RF band. In response to determining to attempt to assign the mobile station to an RF band other than the first RF band, the infrastructure retrieves RF traffic channel decision-related data maintained by the infrastructure before performing further call processing and determines whether the mobile station may be inter-band re-directed based on the RF traffic channel decision-related data. When the mobile station may be inter-band re-directed, the infrastructure re-directs the mobile station to a second RF band of the multiple RF bands.

20 Claims, 3 Drawing Sheets

U.S. PATENT DOCUMENTS

| | | | |
|---|---|---|---|
| 6,456,858 B1 * | 9/2002 | Streter | 455/552.1 |
| 6,466,795 B1 * | 10/2002 | Ahn | 455/450 |
| 6,708,044 B1 * | 3/2004 | Puknat et al. | 455/552.1 |
| RE38,787 E | 8/2005 | Sainton et al. | |
| 2003/0054827 A1 * | 3/2003 | Schmidl et al. | 455/450 |
| 2003/0224730 A1 * | 12/2003 | Muszynski et al. | 455/62 |
| 2004/0152482 A1 * | 8/2004 | Raffel et al. | 455/522 |

FOREIGN PATENT DOCUMENTS

| | | |
|---|---|---|
| WO | 0193523 A2 | 12/2001 |
| WO | 03067903 A2 | 8/2003 |

OTHER PUBLICATIONS

China Office Action, issued by SIPO May 22, 2009.

* cited by examiner

METHOD AND APPARATUS FOR RADIO FREQUENCY BAND ASSIGNMENT IN A WIRELESS COMMUNICATION SYSTEM

CROSS-REFERENCE(S) TO RELATED APPLICATION(S)

The present application claims priority from provisional application Ser. No. 60/584,376, entitled "METHOD AND APPARATUS FOR RADIO FREQUENCY BAND ASSIGNMENT IN A WIRELESS COMMUNICATION SYSTEM," filed Jun. 30, 2004, which is commonly owned and incorporated herein by reference in its entirety.

FIELD OF THE INVENTION

The present invention relates generally to cellular communication systems, and, in particular, to cellular communication systems that support multiple bands.

BACKGROUND OF THE INVENTION

When a mobile station (MS) operating in a cdma2000 communication system attempts to originate a call with a wireless infrastructure, and in particular a base station (BS) included in the wireless infrastructure, via a first radio frequency (RF) band, such as an 800 megahertz (MHz) band, for the purpose of setting up a call, the BS is not aware of the RF capabilities of the MS. The capabilities of the MS, such as the RF bands supported by the MS, as well as an MS identifier (mobile ID), such as an International Mobile Subscriber Identity (IMSI), associated with the MS and a listing of services subscribed to by the MS, are typically stored in a profile of the MS in a Home Location Register (HLR) located elsewhere in the wireless infrastructure.

In response to receiving a request to originate a call from the MS, the BS determines whether the first RF band is congested, for example, whether any traffic channels are available in the first RF band, whether the RF band is operating at or near a maximum power load, or whether the Walsh Codes are exhausted. When the first RF band is not congested, the BS assigns an available traffic channel to the MS. In parallel with the traffic channel assignment, the BS conveys an A1 message, typically an A1 CM Service Request message, to a mobile switching center (MSC) servicing the BS requesting authentication and verification of the MS. In response to receiving the Origination Request, and if the profile is not already stored in a Visitor Location Register (VLR) associated with the MSC, the MSC downloads the entire profile of the MS from the HLR and stores the downloaded profile in the associated VLR. The MSC then verifies and authenticates the MS based on the downloaded profile and informs the BS whether to proceed with, or tear down, the call.

When the first RF band is congested, the BS terminates the access attempt of the MS and releases the call. In such an instance, the BS never communicates with the MSC. Furthermore, the process whereby the BS contacts the MSC and waits for the MSC to download the profile of the MS and to inform the BS whether to proceed with the call consumes an inordinate amount of time and would introduce a call setup delay that is unacceptable to system operators. If the MS is a single-band MS, the user of the MS will have to retry accessing the communication system at a later time. If the MS is a multi-band MS that is capable of operating in multiple RF bands, the MS may then initiate an access attempt of the communication system via a second RF band, such as a 2.1 gigahertz (GHz) band or a 1.9 GHz band. However, requiring a multi-band MS to re-initiate an access attempt in a second RF band is time consuming and is frustrating to users of such MSs.

Therefore a need exists for a method and an apparatus that determines an MS's RF band capabilities with minimum delay upon an initial call origination attempt and that redirects a multi-band MS to a different RF band when an accessed RF band is congested.

DETAILED DESCRIPTION OF THE INVENTION

Figure 1:
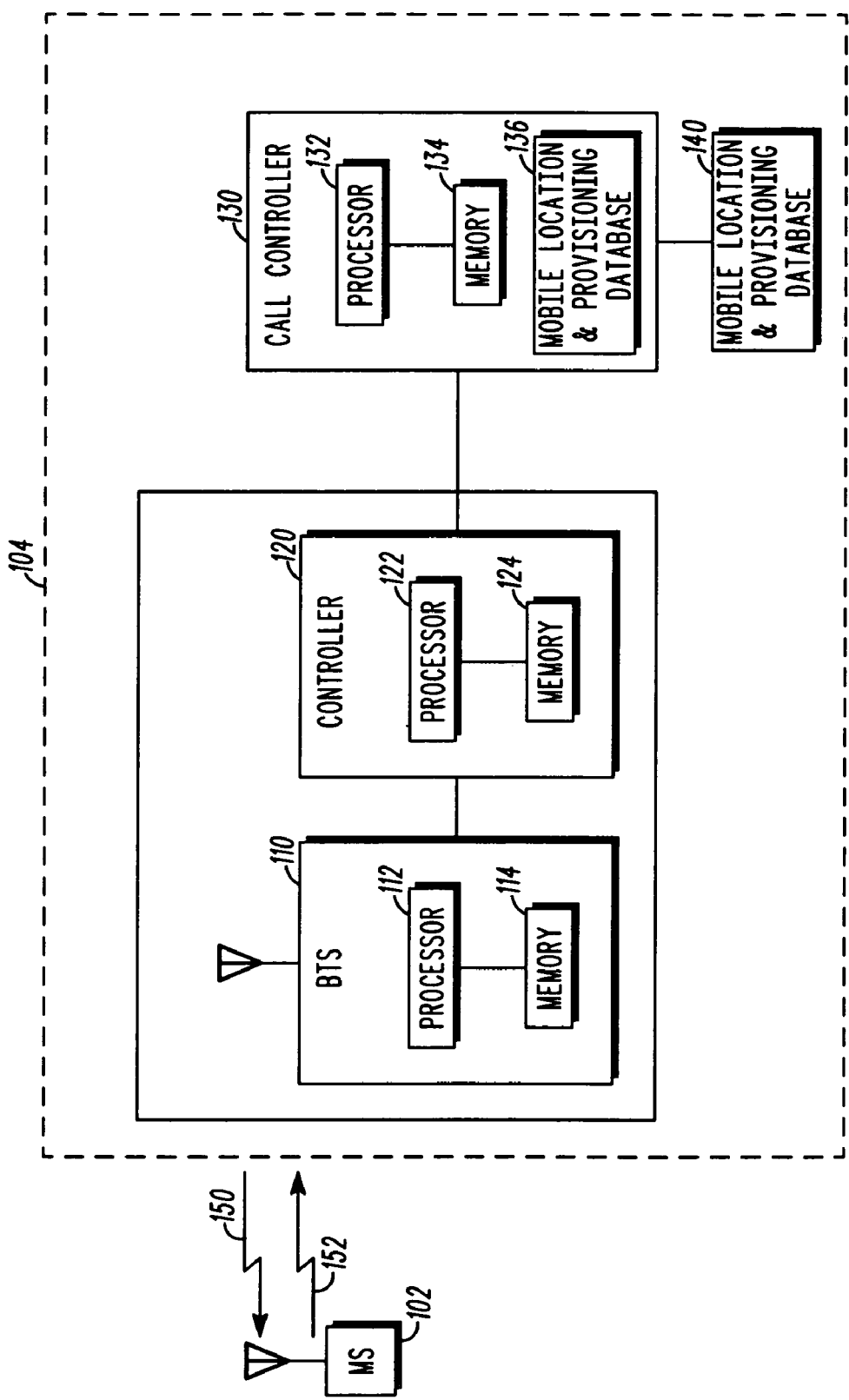
FIG. 1 is a block diagram of a wireless communication system in accordance with an embodiment of the present invention.

To address the need for a method and an apparatus that determines radio frequency (RF) band capabilities of an originating mobile station (MS) with minimum delay and assigns the MS to a different RF band without the system capacity consumption and the call setup delay of the prior art, a wireless communication system is provided that comprises a mobile station in communication with an infrastructure that supports multiple radio frequency (RF) band classes. When the infrastructure receives a request to originate a call from the mobile station via a first radio frequency (RF) band of the multiple RF bands, the infrastructure determines whether to attempt to assign the mobile station to an RF band other than the first RF band. In response to determining to attempt to assign the mobile station to an RF band other than the first RF band, the infrastructure retrieves RF traffic channel decision-related data maintained by the infrastructure before performing further call processing and determines whether the mobile station may be inter-band re-directed based on the RF traffic channel decision-related data. When the mobile station may be inter-band re-directed, the infrastructure re-directs the mobile station to a second RF band of the multiple RF bands.

Generally, an embodiment of the present invention encompasses a method for assigning an RF band to the mobile station when the mobile station is engaged in a process of originating a call via an infrastructure that supports multiple radio frequency (RF) bands. The method includes receiving a request to originate a call from the mobile station via a first RF band of the multiple bands and determining whether to attempt to assign the mobile station to an RF band other than the first RF band. The method further includes, in response to determining to attempt to assign the mobile station to an RF band other than the first RF band, retrieving radio frequency traffic channel decision-related data maintained by the infrastructure and determining whether the mobile station may be inter-band re-directed based on the radio frequency traffic channel decision-related data.

Another embodiment of the present invention encompasses an apparatus for assigning an RF band to a mobile station when the mobile station is engaged in a process of initiating a connection with an infrastructure. The apparatus includes a base station that receives call origination request by the mobile station via a first radio frequency (RF) band and, in response to receiving the call origination request, determines whether to attempt to assign the mobile station to an RF band other than the first RF band. In response to determining to assign the mobile station to an RF band other than the first RF band, the base station requests infrastructure-maintained RF traffic channel decision-related data associated with the mobile station and in response to the request, receives the infrastructure-maintained RF traffic channel decision-related data. Based on the RF traffic channel decision-related data, the base station determines whether the mobile station may be inter-band re-directed, and in response to determining that the mobile station may be inter-band re-directed, instructs the mobile station to switch to the second RF band before performing any other call processing.

Still another embodiment of the present invention encompasses a call controller that receives a service request, determines that the service request includes a request for infrastructure-maintained radio frequency traffic channel decision-related data associated with a mobile station, and in response to determining that the service request includes a request for infrastructure-maintained radio frequency traffic channel decision-related data, retrieves only a portion of the profile of the mobile station, wherein the portion comprises the radio frequency traffic channel decision-related data associated with the mobile station, and conveys the retrieved radio frequency traffic channel decision-related data to the base station before performing further call processing.

The present invention may be more fully described with reference to FIGS. 1-2B. FIG. 1 is a block diagram of a wireless communication system 100 in accordance with an embodiment of the present invention. Communication system 100 includes at least one mobile station (MS) 102, such as but not limited to a cellular telephone, a radiotelephone, or a wireless modem that provides a wireless interface for data terminal equipment coupled to the modem. MS 102 is capable of operating in, that is, supporting, multiple radio frequency (RF) bands that are also supported by an infrastructure 104 of communication system 100. The RF band capabilities of the MS are maintained in a memory of the MS. Communication system 100 further includes a wireless infrastructure 104 that comprises at least one base station (BS) 106 that is coupled, preferably via an A1 interface, to a call controller 130, preferably a Mobile Switching Center (MSC). In turn, call controller 130 is further coupled to a mobile location and provisioning database 140, such as a Home Location Register (HLR).

BS 106 includes at least one base transceiver station (BTS) 110 that is coupled to a controller 120, typically a Base Station Controller and/or a Centralized Base Station Controller (BSC/CBSC). Controller 120 controls and manages the operation of BTS 110 and communication by the BTS with any other BTSs of BS 106. BS 106 is capable of providing communications services in at least one RF band, for example, an 800 megahertz (MHz) band or a 1.9 gigahertz (GHz) band, to mobile stations, such as MS 102, located in a coverage area serviced by the BS. Call controller 130 routes calls within system 100 and provides authentication and verification support for BSs, such as BS 106, serviced by the call controller. Call controller 130 includes a local mobile location and provisioning database 136, such as a Visitor Location Register (VLR); however, in another embodiment of the present invention, mobile location and provisioning database 136 may be external to, and in communication with, call controller 130.

Each of BTS 110, controller 120, and call controller 130 includes a respective processor 112, 122, 132, such as one or more microprocessors, microcontrollers, digital signal processors (DSPs), combinations thereof or such other devices known to those having ordinary skill in the art. Each of BTS 110, controller 120, and call controller 130 further includes a respective one or more memory devices 114, 124, 134 associated with the respective processor, such as random access memory (RAM), dynamic random access memory (DRAM), and/or read only memory (ROM) or equivalents thereof, that stores programs and software such as programs, applications, and operating protocols, that are executed by the processor and that permit the functioning of the MS, BS, controller, or call controller in system 100. The one or more memory devices 124, 134 of controller 120 and call controller 130 each further stores information concerning RF bands that may be supported by infrastructure 104. Unless otherwise specified herein, the functions performed herein by each of BTS 110, controller 120, and call controller 130 are performed by a respective processor 112, 122, and 132 of the BTS, controller, and call controller.

Mobile location and provisioning database 140 maintains a profile of each MS, such as MS 102, subscribed to communication services provided by an operator of system 100. The profile of each such MS includes an MS identifier (mobile ID), such as an International Mobile Subscriber Identity (IMSI), associated with the MS, RF bands supported by the MS, and any subscription services provided by communication system 100 and subscribed to by the MS, such as call forwarding, short message service (SMS), caller identification (caller ID), and inter-band call re-direction service. Database 140 further maintains and tracks provisioning and mobility information with respect to each such MS, including a registration of the MS when the MS activates in communication system 100 and a location of the MS, such as a BS serving the MS. When an MS, such as MS 102, attempts to originate a call within a coverage area serviced by call controller 130, the call controller, in response to a request from a BS servicing the MS, retrieves the profile of the MS from remote mobile location and provisioning database 140 and stores the MS's profile in local mobile location and provisioning database 136. In another embodiment of the present invention, the profile of an MS serviced by call controller 130 may be locally stored in mobile location and provisioning database 136. In such an embodiment, when the MS attempts to originate a call then call controller 130, in response to a request from the BS servicing the MS, retrieves the MS's profile from database 136.

Each RF band supported by BS 106 is associated with a forward link, such as forward link 150, and a reverse link, such as reverse link 152, of communication system 100. Each forward link is associated with and operates in one of the multiple RF bands and includes a forward common signaling channel and a forward traffic channel. Each reverse link 152 also is associated with and operates in one of the multiple RF bands and includes a reverse common signaling channel and a reverse traffic channel.

Communication system 100 comprises a wireless communication system that supports multiple RF bands. In order for MS 102 to establish a connection with an external network (not shown) connected to infrastructure 104, BS 106 operates in accordance with well-known wireless telecommunications protocols. By operating in accordance with well-known protocols, a user of MS 102 can be assured that MS 102 will be able to communicate with infrastructure 104 and establish a communication link with the external network via the infrastructure. Preferably, communication system 100 operates in accordance with at least one of the 3GPP2 and TIA/EIA (Telecommunications Industry Association/Electronic Industries Association) IS-95B, IS-2000, IS-2000-A, IS-2000-B, IS-2000-C, IS-2000-D, and IS-2001-C (v1.0) standards, which provide a compatibility standards for CDMA (Code Division Multiple Access) and cdma2000 communication systems, including IS-2001 air interfaces. The standards specify wireless telecommunications system operating protocols, including radio system parameters and call processing procedures. However, those who are of ordinary skill in the art realize that communication system 100 may operate in accordance with any one of a variety of wireless communication systems, such as a Global System for Mobile communication (GSM) communication system, a Time Division Multiple Access (TDMA) communication system, a Frequency Division Multiple Access (FDMA) communication system, or an Orthogonal Frequency Division Multiple Access (OFDM) communication system.

In communication system 100, when MS 102 originates a call with infrastructure 104 via a reverse common signaling channel in a reverse link 152 associated with a first RF band, and the band is congested or is otherwise unavailable for assignment to the MS, infrastructure 104 determines whether the MS may be assigned other RF bands before extensively executing call processing. When MS 102 may be inter-band re-directed, that is, supports an alternate RF band and is permitted to be re-directed to such an RF band, which RF band is also supported by infrastructure 104, the infrastructure re-directs the MS to a reverse signaling channel in a reverse link that is associated with the alternate RF band prior to performing extensive call processing. As a result, MS 102 is not required to autonomously initiate a new access attempt in a second RF band when the first RF band is congested, thereby minimizing call setup time when the first RF band is congested and further minimizing user frustration with respect to utilizing the full functionality of a multi-band MS.

Figure 2A:
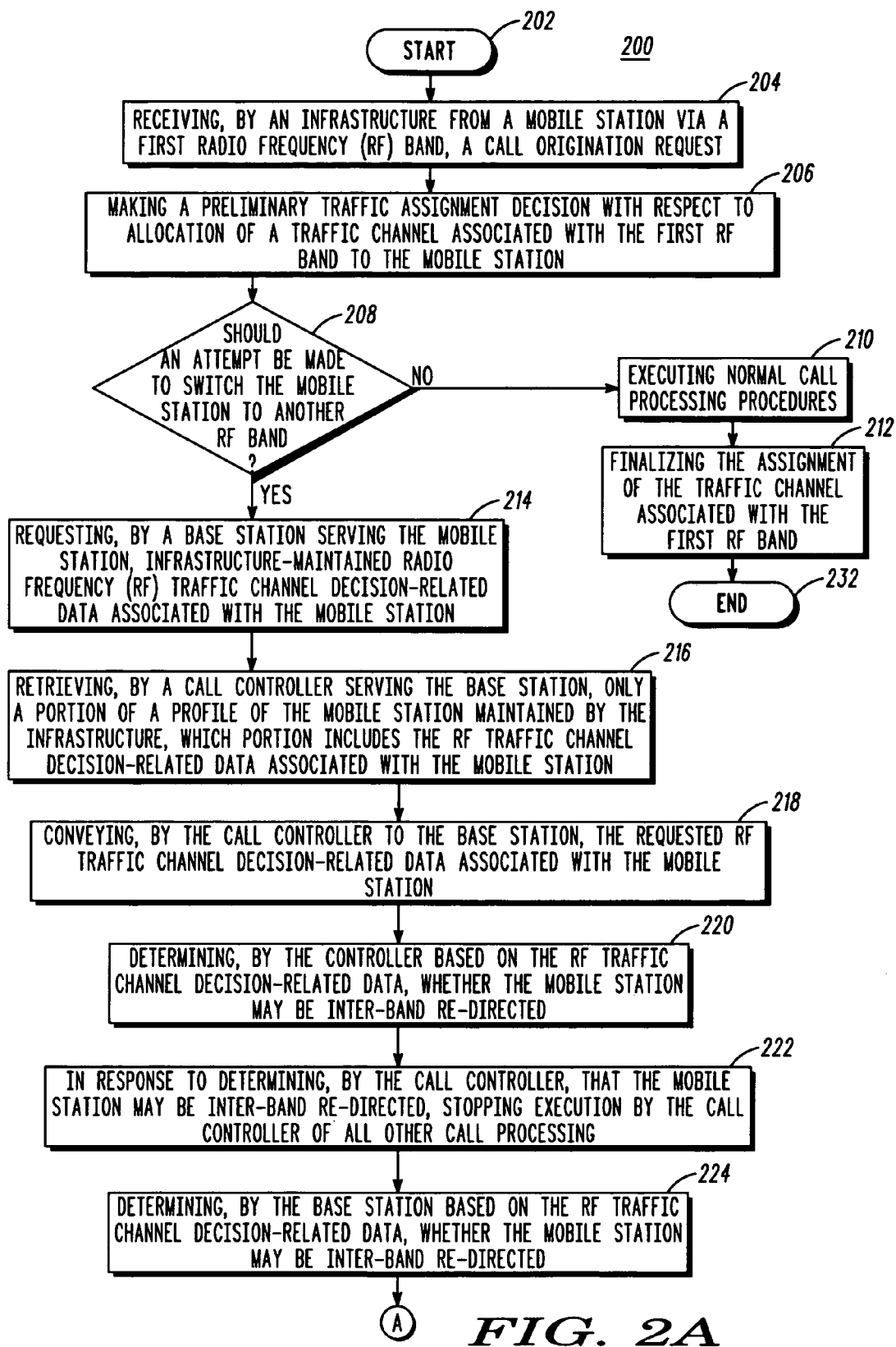
FIG. 2A is a logic flow diagram of steps executed by the communication system of FIG. 1 in allocating a radio frequency band to the mobile station of FIG. 1 during a call origination attempt by the mobile station in accordance with an embodiment of the present invention.
Figure 2B:
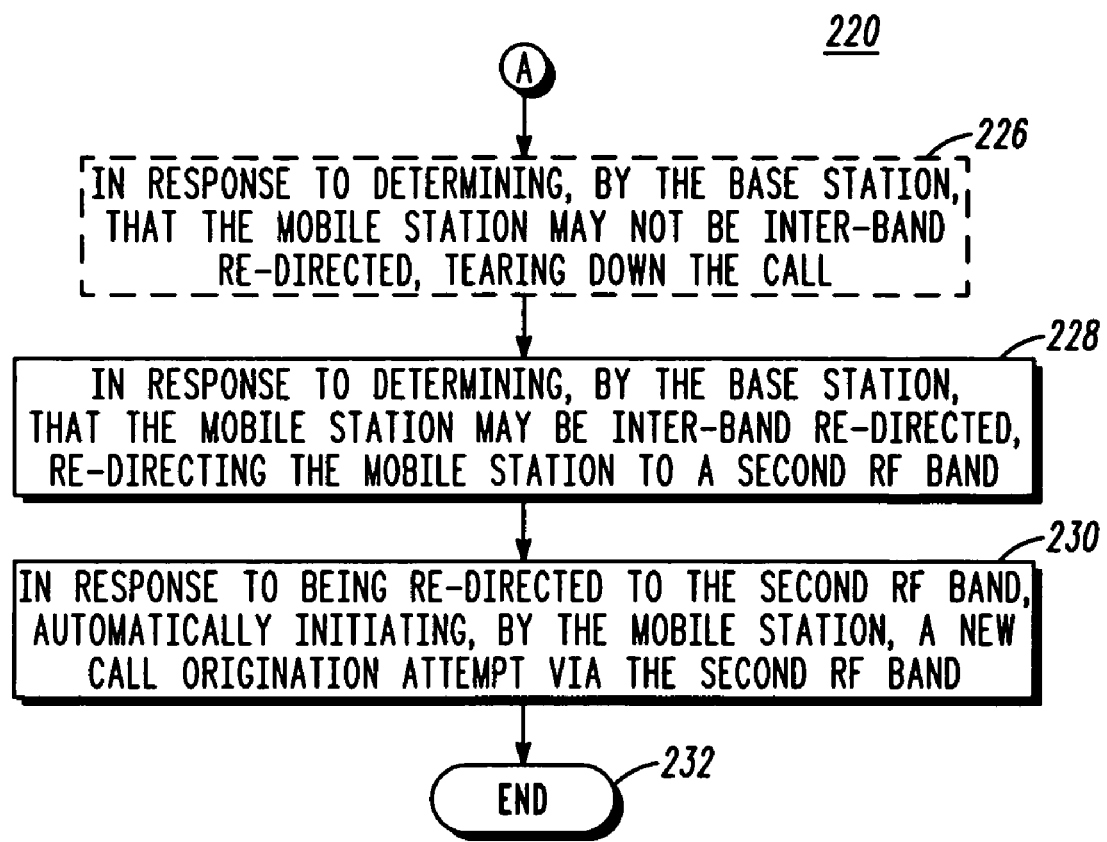
FIG. 2B is continuation of the logic flow diagram of FIG. 2A depicting steps executed by the communication system of FIG. 1 in allocating a radio frequency band to the mobile station of FIG. 1 during a call origination attempt by the mobile station in accordance with an embodiment of the present invention.

FIGS. 2A and 2B depict a logic flow diagram 200 of steps executed by communication system 100 in allocating an RF band to MS 102 during a call origination attempt by the MS in accordance with an embodiment of the present invention. Logic flow diagram 200 begins (202) when BS 106, and in particular BTS 110, receives (204) a request to originate a call, preferably an origination request, from MS 102 via a reverse common signaling channel in a reverse link 152 associated with a first RF band. The request includes a mobile ID associated with the MS. In response to receiving the call origination request, BS 106, and in particular BTS 110 or controller 120, makes (206) a preliminary traffic assignment decision with respect to allocation of a traffic channel associated with the first RF band to MS 102. In addition, in response to receiving the call origination request, BS 106, and in particular BTS 110 or controller 120, determines (208) whether to attempt to switch MS 102 to an alternate, second RF band, that is, an RF band other than the first RF band accessed by the MS.

For example, BS 106 may determine to attempt to switch MS 102 to an alternate RF band because the RF band in which MS 102 is accessing is congested, for example, that forward link 150 is congested. By way of another example, BS 106 may determine to attempt to switch MS 102 to an alternate RF band in order to free up the current RF band for emergency communications. One who is of ordinary skill in the art realizes that numerous reasons exist for switching MS 102 to a RF band other than the RF band in which the MS is currently accessing without departing from the spirit and scope of the present invention.

When BS 106 determines (208) not to attempt to switch MS 102 to an alternate, second RF band, the BS, and in particular controller 120, conveys a service request, such as an A1 CM Service Request, to call controller 130 requesting service for MS 102 and providing the mobile ID associated with MS. In response to receiving the service request, call controller 130 executes (210) normal call processing steps, including allocating a terrestrial circuit to the call, authenticating and verifying MS 102 based on the mobile ID included in the request received from the MS, and starting a billing record associated with the call. As part of the process of authenticating and verifying MS 102, call controller 130 downloads the entire profile of MS 102 from remote mobile location and provisioning database 140 and locally stores the profile in mobile location and provisioning database 136. In another embodiment of the present invention, wherein the profile of MS 102 is maintained in mobile location and provisioning database 136, call controller 130 retrieves the profile of the MS from database 136. Call controller then informs BS 106 that a circuit has been allocated and that MS 102 is authenticated, typically by conveying an A1 Assignment Request to the BS. In response to being informed of the authentication of MS 102 and the allocation of the terrestrial circuit, BS 106, and in particular BTS 110 or controller 120, finalizes (212) the assignment of the traffic channel to MS 102 and the call proceeds as is well-known in the art. Logic flow 200 then ends (232).

When BS 106 determines (208) to attempt to switch MS 102 to a second RF band, the BS, and in particular BTS 110 or controller 120, conveys a modified service request to call controller 130, which service request is modified to include a request (214) for infrastructure-maintained radio frequency (RF) traffic channel decision-related subscriber data associated with the MS. For example, BS 106 may request the RF traffic channel decision-related subscriber data by including such a request in the service request conveyed by BS 106 to call controller 130. For example, BS 106 may convey a modified version of an A1 CM Service Request to call controller 130, which A1 CM Service Request is modified to include a request for RF traffic channel decision-related subscriber data.

The RF traffic channel decision-related subscriber data comprises data that enables BS 106 to determine whether MS 102 may be assigned to an RF band other than the RF band accessed by the MS. For example, the traffic channel decision-related subscriber data may include the RF band capabilities of MS 102. By way of another example, when communication system 100 includes different subscription packages for system subscribers, such as a subscription package that includes a call re-direction service that permits automatic re-direction of a call from a congested RF band initially accessed by an MS to another, non-congested RF band, the traffic channel decision-related subscriber data may include information concerning any such subscription package subscribed to by a user of the MS.

In response to receiving the modified service request and determining that the request includes a request for traffic channel decision-related subscriber data, call controller 130 executes an expedited response procedure. That is, call controller 130 retrieves (216) the traffic channel decision-related subscriber data from the profile of MS 102 maintained in infrastructure 104, and in particular in mobile location and provisioning database 136 or mobile location and provisioning database 140. In one embodiment of the present invention, wherein the profile of MS 102 is maintained in mobile location and provisioning database 140, call controller 130 downloads the profile of the MS from database 140, which profile includes the traffic channel decision-related subscriber data associated with the MS. Call controller 130 then stores the downloaded profile in mobile location and provisioning database 136 and retrieves, from database 136, only a portion of the profile that includes the associated traffic channel decision-related subscriber data. In another embodiment of the present invention, wherein the profile of MS 102 is maintained in mobile location and provisioning database 136, call controller 130 retrieves only a portion of the profile of the MS from database 136, which portion includes the traffic channel decision-related subscriber data and which portion is less than the entire profile of the MS.

Call controller 130 then conveys (218) the downloaded or retrieved traffic channel decision-related subscriber data to BS 106 before performing any other call processing, such as the allocation of terrestrial circuits, starting of a billing record, further authentication/verification, and so on. For example, call controller 130 may convey the traffic channel decision-related subscriber data to BS 106 via a modified version of an A1 Assignment Request message, which A1 Assignment Request message is modified to include the traffic channel decision-related subscriber data. In addition, based on the downloaded or retrieved traffic channel decision-related subscriber data, call controller 130 determines (220) whether MS 102 may be inter-band re-directed, that is, whether MS 102 is a dual-band MS, whether MS 102 is permitted to be assigned to another RF band, and whether MS is capable of supporting an inter-band re-direct to target RF band of infrastructure 104. When MS may be inter-band re-directed, that is, is a multi-band MS that is permitted to be assigned to another RF band and that is capable of supporting an inter-band re-direct to target RF band of infrastructure 104, then call controller 130 stops (222) execution of all other call processing, such as allocation of the terrestrial circuits, starting of a billing record, and further authentication and verification of MS 102.

Based on the RF traffic channel decision-related subscriber data, BS 106, and in particular BTS 110 or controller 120, also determines (224) whether MS 102 may be inter-band re-directed, that is, is a dual-band MS that supports a second RF band also supported by infrastructure 104 and that is permitted to be re-directed to such a band. When BS 106 determines that MS 102 may not be inter-band re-directed, then BS 106, and in particular BTS 110, optionally may tear down (226) the call and terminate the access attempt of the MS. For example, MS 102 may not support a second RF band, other RF bands supported by MS 102 may not be supported by infrastructure 104, and/or MS 102, more particularly the user of MS 102, may not subscribe to a subscription package that permits the re-direction of the MS to an alternate RF band from the RF band initially accessed by the MS.

When BS 106 determines (224) that MS 102 may be inter-band re-directed, then BS 106, and in particular BTS 110 or controller 120, re-directs (228) MS 102 to the second RF band by conveying a re-direction message to the MS. For example, BS 106 may convey an Extended Channel Assignment Message (ECAM) to MS 102 via the forward common signaling channel of forward link 150 that assigns MS 102 to a signaling channel, such as a paging/access channel, in the second RF band. ECAM messages are well-known in the art and are described in detail in the TIA/EIA (Telecommunications Industry Association/Electronic Industries Association) IS-2000.5-C standard. In response to receiving the re-direction message, MS 102 automatically initiates (230) a new access attempt in the second RF band. For example, when BS 106 further supports the second RF band, MS 102 may initiate a new access attempt by conveying a new origination message to BS 106 via the second RF band. By way of another example, when BS 106 only supports the first RF band, MS 102 may initiate a new access attempt by conveying a new origination message to another BS (not shown) in communication system 100 that supports the second RF band. Logic flow 200 then ends (232).

By retrieving RF traffic channel decision-related data maintained by the infrastructure and associated with an MS, that is, MS 102, originating a call, prior to performing further call processing, communication system 100 provides an expedited re-direction determination. The retrieval of the RF traffic channel decision-related data is expedited because call controller 130 retrieves the data from database 136 prior to further call processing and without further retrieving the entire profile of the MS. The result is an expedited, or speedier, re-direction of the MS to a second RF band, as the infrastructure is provided with an expedited process for assessing the MS's re-direction capabilities when the first RF band is congested. In addition, system resources are preserved because, when MS 102 is a multi-band MS that may be inter-band re-directed, call controller 130 stops further processing of the call originated by the MS.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather than a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. In a wireless communication system comprising a mobile station in communication with an infrastructure that supports a plurality of radio frequency (RF) bands, a method for assigning an RF band to the mobile station when the mobile station is engaged in a process of originating a call via the infrastructure, the method comprising:

receiving a request to originate a call from the mobile station via a first RF band of the plurality of RF bands;

determining whether to attempt to assign the mobile station to an RF band of the plurality of RF bands other than the first RF band;

in response to determining to attempt to assign the mobile station to an RF band other than the first RF band, retrieving only radio frequency traffic channel decision-related data from a profile of the mobile station maintained by the infrastructure;

determining whether the mobile station is to be inter-band re-directed based on the radio frequency traffic channel decision-related data.

2. The method of claim 1, wherein determining whether the mobile station is to be inter-band redirected comprises steps of:

determining whether the mobile station is a multi-band mobile station;

determining whether the mobile station supports a same second radio frequency (RF) band as the infrastructure; and determining whether the mobile station is permitted to be re-directed to the second RF band.

3. The method of claim 1, further comprising, in response to determining that the mobile station is to be inter-band re-directed, instructing the mobile station to switch to the second radio frequency band.

4. The method of claim 3, wherein instructing the mobile station to switch to the second radio frequency (RF) band comprises:

determining whether the second RF band is a band that is supported by the infrastructure; and when the mobile station is to be assigned to the second RF band and the second RF band is supported by the infrastructure, instructing the mobile station to switch to the second RF band.

5. The method of claim 1, wherein determining whether to attempt to assign the mobile station to a radio frequency (RF) band other than the first RF band comprises one or more of determining whether the first RF band is congested and determining whether to free up the first RF band for emergency communications.

6. The method of claim 1, wherein retrieving radio frequency traffic channel decision-related data from a profile of the mobile station maintained by the infrastructure comprises:

requesting, by a base station from an associated controller, radio frequency traffic channel decision-related data associated with the mobile station;

in response to receiving the request, retrieving, by the controller, the requested radio frequency traffic channel decision-related data; and conveying, by the controller to the base station, the retrieved radio frequency traffic channel decision-related data before performing any other call processing.

7. The method of claim 6, wherein conveying the retrieved radio frequency traffic channel decision-related data before performing any other call processing comprises conveying the retrieved radio frequency traffic channel decision-related data before performing any one or more of allocating terrestrial circuits to the call and starting of a billing record.

8. The method of claim 6, wherein conveying the retrieved radio frequency traffic channel decision-related data before performing any other call processing comprises:

conveying the retrieved radio frequency traffic channel decision-related data;

determining whether the mobile station is to be inter-band re-directed; and when the mobile station is to be inter-band re-directed, stopping further authentication and verification activities.

9. The method of claim 6, wherein the radio frequency traffic channel decision-related data is maintained in a profile of the mobile station and wherein retrieving, by the controller, the requested radio frequency traffic channel decision-related data comprises retrieving, by the controller, a portion of the profile of the mobile station, which portion comprises the radio frequency traffic channel decision-related data.

10. An apparatus for assigning a radio frequency (RF) band to a mobile station when the mobile station is engaged in a process of initiating a connection with an infrastructure, the apparatus comprising a base station that receives call origination request from the mobile station via a first radio frequency (RF) band, in response to receiving the call origination request, determines whether to attempt to assign the mobile station to an RF band other than the first RF band, in response to determining to assign the mobile station to an RF band other than the first RF band, requests only infrastructure-maintained RF traffic channel decision-related data associated with the mobile station, in response to the request, receives only the infrastructure-maintained RF traffic channel decision-related data while not receiving other information stored in the profile of the mobile station, determines whether the mobile station is to be inter-band re-directed based on the RF traffic channel decision-related data, and in response to determining that the mobile station is to be inter-band re-directed, instructs the mobile station to switch to the second RF band before performing any other call processing.

11. The apparatus of claim 10, wherein the base station determines whether the mobile station is to be inter-band redirected by determining whether the mobile station is a multi-band mobile station, determining whether the mobile station supports a same second radio frequency (RF) band as the infrastructure, and determining whether the mobile station is permitted to be re-directed to the second RF band.

12. The apparatus of claim 11, wherein the base station determines whether to attempt to assign the mobile station to a radio frequency (RF) band other than the first RF band based on one or more of whether the first RF band is congested and whether to free up the first RF band for emergency communications.

13. The apparatus of claim 10, further comprising a call controller coupled to the base station that receives the request for radio frequency traffic channel decision-related data and, in response to receiving the request, retrieves infrastructure-maintained radio frequency traffic channel decision-related data associated with the mobile station and conveys the retrieved radio frequency traffic channel decision-related data to the base station before performing any other call processing.

14. The apparatus of claim 13, wherein the any other call processing comprises any one or more of allocating terrestrial circuits to the call and starting of a billing record.

15. The apparatus of claim 13, wherein the call controller conveys the retrieved radio frequency traffic channel decision-related data to the base station before performing any other call processing by conveying the retrieved radio frequency traffic channel decision-related data to the base station, determining whether the mobile station is to be inter-band re-directed, and, when the mobile station is to be inter-band re-directed, stopping further authentication and verification activities.

16. The apparatus of claim 13, further comprising a mobile location and provisioning database coupled to the call controller that maintains a profile of the mobile station, wherein the profile comprises the radio frequency traffic channel decision-related data, and wherein the call controller downloads the radio frequency traffic channel decision-related data from the mobile location and provisioning database.

17. The apparatus of claim 13, wherein the call controller comprises a mobile location and provisioning database that maintains a profile of the mobile station, wherein the profile comprises the radio frequency traffic channel decision-related data, and wherein the call controller retrieves the radio frequency traffic channel decision-related data from the mobile location and provisioning database.

18. The apparatus of claim 10, wherein the base station instructs the mobile station to switch to the second radio frequency (RF) band by determining whether the second RF band is a band that is supported by the infrastructure and, when the mobile station is to be assigned to the second RF band and the second RF band is supported by the infrastructure, instructing the mobile station to switch to the second RF band.

19. A call controller that receives a service request, determines that the service request includes a request for infrastructure-maintained radio frequency traffic channel decision-related data associated with a mobile station, and in response to determining that the service request includes a request for infrastructure-maintained radio frequency traffic channel decision-related data, retrieves only a portion of the profile of the mobile station, wherein the portion comprises the radio frequency traffic channel decision-related data associated with the mobile station, and conveys only the retrieved radio frequency traffic channel decision-related data to the base station before performing further call processing.

20. The call controller of claim 19, wherein the call controller further determines, based on the radio frequency traffic channel decision-related data, whether the mobile station is to be inter-band re-directed and, in response to determining that the mobile station is to be inter-band re-directed, stops performing further call processing.

* * * * *